US012332454B1

(12) United States Patent
Hu

(10) Patent No.: US 12,332,454 B1
(45) Date of Patent: Jun. 17, 2025

(54) DISPLAY GLASSES USING SINGLE IMAGER

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

(21) Appl. No.: 18/959,034

(22) Filed: Nov. 25, 2024

(51) Int. Cl.
*G02B 27/01* (2006.01)
(52) U.S. Cl.
CPC .. *G02B 27/0172* (2013.01); *G02B 2027/0174* (2013.01); *G02B 2027/0178* (2013.01)
(58) Field of Classification Search
CPC ........ G02B 27/0172; G02B 2027/0174; G02B 2027/0178; G02B 27/10; G02B 27/1086; G02B 27/28; G02B 27/106; G02B 30/25
See application file for complete search history.

(56) References Cited

U.S. PATENT DOCUMENTS

2018/0203243 A1* 7/2018 Huang .................... G02B 30/25
2022/0171190 A1* 6/2022 Trisnadi ................ G02B 27/017

FOREIGN PATENT DOCUMENTS

| CN | 111999895 A | * | 11/2020 |
| CN | 115576105 A | * | 1/2023 |
| CN | 116540413 A | * | 8/2023 |
| CN | 116540484 A | * | 8/2023 |
| KR | 102072012 B1 | * | 1/2020 |

OTHER PUBLICATIONS

Dewen Cheng et al "Automatic control method for freeform surface shapes", vol. 31, No. 18 / Aug. 28, 2023 / Optics Express 29019.
Jianghao Xiong et al "Holographic Optical Elements for Augmented Reality: Principles, Present Status, and Future Perspectives", Adv. Photonics Res. 2021, 2, 2000049.
Jianghao Xiong et al "Holo-imprinting polarization optics with a reflective liquid crystal hologram template", Light: Science & Applications (2022) 11:54.
Ziqian He et al, "Reflective Polarization vol. Lens with Small f-No. and Large Diffraction Angle", Advanced Optical Materials, Mar. 2020.
Jianghao Xiong, et al "Planar liquid crystal polarization optics for augmented reality and virtual reality: from fundamentals to applications", https://elight.springeropen.com/articles/10.1186/s43593-021-00003-x.

* cited by examiner

Primary Examiner — Collin X Beatty
(74) Attorney, Agent, or Firm — Joe Zheng

(57) ABSTRACT

Techniques for designing display (glasses) devices in light-weight and small footprint are described. To reduce the cost, weight and volume of the display devices, only one imager is used. An optical engine (cube) is provided to split optical images from the imager into a first (left) portion and a second (right) portion. Each of the portions is redirected via one or more optical lenses to a predefined path, where the optical lenses are based upon polarization volume hologram (PVH) lenses in one embodiment, all having different optical characteristics to diffract light beams at predefined angles.

14 Claims, 22 Drawing Sheets

1. Photo-alignment material deposition    2. Pattern exposure    3. LC deposition    4. UV polymerization

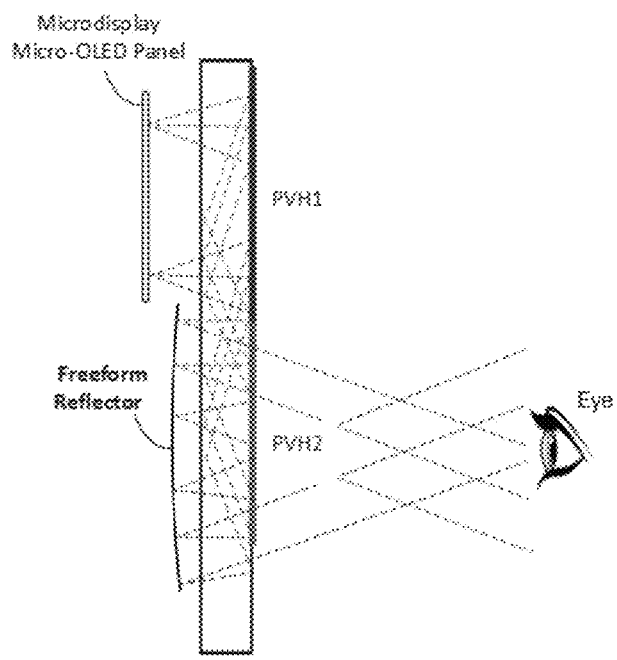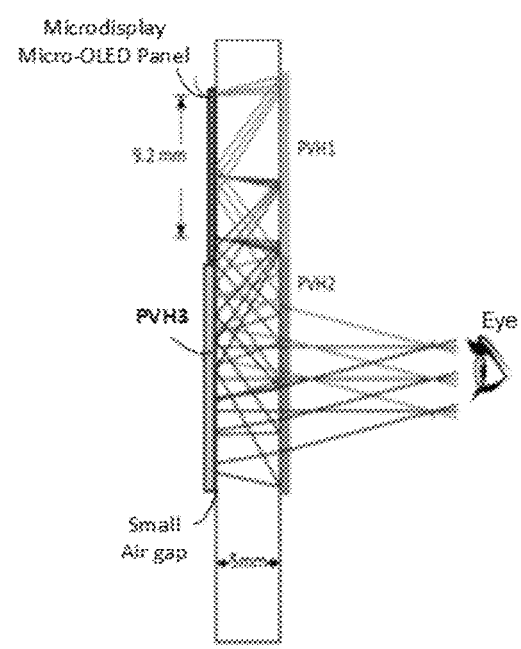
*FIG. 4E*  *FIG. 4F*

(Perspective overview)

μOLED Bar 1080P Unit

DISPLAY GLASSES USING SINGLE IMAGER

BACKGROUND OF THE INVENTION

Field of the Invention

The present invention generally relates to the area of display devices and more particularly relates to architecture and designs of display devices, where a display device is made in form of a pair of glasses, and may be used in various applications including virtual reality (VR), augmented reality (AR) and head-up display (HUD).

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact. Besides AR and VR, there is also MR, XR or others, where MR brings the best of both AR and VR together by capturing the real-world through a series of cameras and sensors, then projecting it on a display before the eyes of users. In MR, virtual objects are seamlessly integrated into reality for completely new experiences. XR refers to all the above.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary pair of goggles now commonly seen in the market for the application of delivering or displaying VR or AR. No matter how the goggles are designed, the whole thing appears bulky and heavy, and causes inconvenience when worn on a user. Further most of the goggles cannot be seen through. In other words, when a user wears a pair of goggles, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (1.2 lbs). With the weight, a wearer won't feel comfortable when wearing it for a period. Indeed, what is available in the market is generally heavy and bulky in comparison to normal glasses. Thus, there is another need for a wearable AR/VR viewing or display device that looks similar to a pair of regular glasses but is also amenable to smaller footprint, enhanced impact performance, lower cost packaging, and easier manufacturing process. FIG. 1C is another display device from Apple. Not only does it look bulky, it is also expensive. It is reported that Apple may have to stop the production of the devices. Thus, there is yet another need for a wearable AR/VR viewing or display device that comes lightweight but also affordable.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of ultralight-weight wearable devices for displaying images or videos in XR or other applications. According to one aspect of the present invention, a display device is made in form of a pair of glasses and includes a minimum number of parts to reduce the complexity, costs and weight thereof. Different from a prior art system that often employs two imagers, respectively for left and right viewing, the display device operates based on only one imager. Optical images from the imager are projected alternatively or simultaneously to the left and right (integrated) lenses via an optical engine.

According to another aspect of the present invention, the display device includes at least one integrated lens that includes one or more optical lenses coated with or disposed with one or more reflective lens or films to ensure optical images are properly reflected, deflected or diffracted to a desired direction or location, for example, a viewing path that a human eye can view or perceive the optical images. These optical lenses, films or coatings are used to facilitate reflections, deflection or diffractions of the optical images to the desired location while keeping the footprint of the integrated lens as small as possible.

According to still another aspect of the present invention, the imager is a device that produces an optical image/video to be projected into either one or both of the integrated lenses. In one implementation, the imager is a microdisplay panel (e.g., LCOS, Micro OLED or Micro LED). In another embodiment, the imager includes one or more subpanels, each of the subpanels displays a designated colored image (e.g., red, green and blue images).

According to still another aspect of the present invention, a focusing or lens mechanism (controllable via one or more lenses) is provided to capture the optical images from the imager and projects these images into the integrated lens via the optical cube.

According to still another aspect of the present invention, the optical films or coatings used are based on liquid crystals disposed on a substrate. In one implementation, one or more optical films based on planar or substantially planar optics (all referred to as planar optics herein) that are individually calibrated to redirect light beams at a predefined angle to a predefined direction. In one embodiment, the planar optics come in lenses, films or coatings based on liquid crystal polarization optics to reflect, diffract or redirect the images to one or more predefined directions so as to minimize the footprint of the integrated lens.

According to still another aspect of the present invention, there optical films are based upon polarization volume hologram (PVH) lenses, all having different optical characteristics to diffract light beams at predefined angles. When one PVH lens is not sufficient enough, two or more of the same PVH lenses may be employed to increase the efficiency of the redirection of light beams.

According to still another aspect of the present invention, an integrated lens may be further coated with one for more films with optical characteristics that amplify the optical image before the eyes of the user.

According to yet another aspect of the present invention, the glasses include a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

The present invention may be implemented as an apparatus, a method and part of system. Different implementations may yield different benefits, objects and advantages. In one embodiment, the present invention is a display device for displaying a color image or images. The display device comprises a single imager producing optical images, an optical cube provided to split the optical images into a first portion and a second portion, and an integrated lens receiving a portion of the optical images, wherein the integrated lens includes one or more lenses, disposed on an exterior side of the integrated lens, directing the portion of the optical images to a predefined direction, wherein the portion of the optical images is turned into to an optical path an human eye perceives. The portion of the optical images is either the first portion or the second portion, the integrated lens is either a right one or a left in the display device. The one or more lenses are polarization volume hologram (PVH) lenses and diffract respectively the first portion or the second portion to a corresponding predefined direction.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIGS. 4E and 4F each show another embodiment in which instead of using a reflector shown in FIG. 4D, a third lens PVH3 may be used to possibly reduce the weight, volume or thickness of the lens;

DETAILED DESCRIPTION OF THE PREFERRED EMBODIMENTS

Figure 1A:
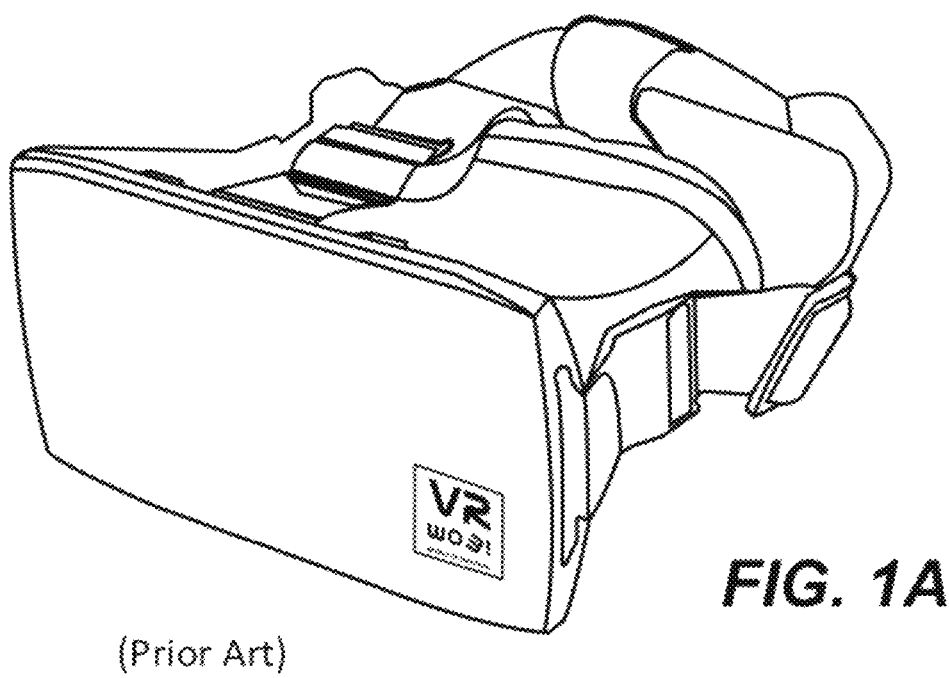
FIG. 1A shows an exemplary goggle now commonly seen in the market for the application of delivering or displaying VR or AR.
Figure 1B:
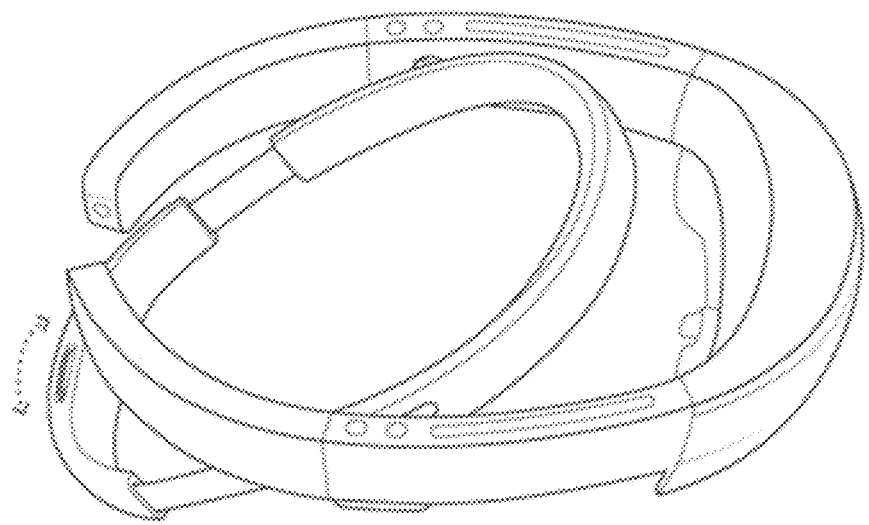
FIG. 1B shows a sketch of HoloLens from Microsoft.
Figure 1C:
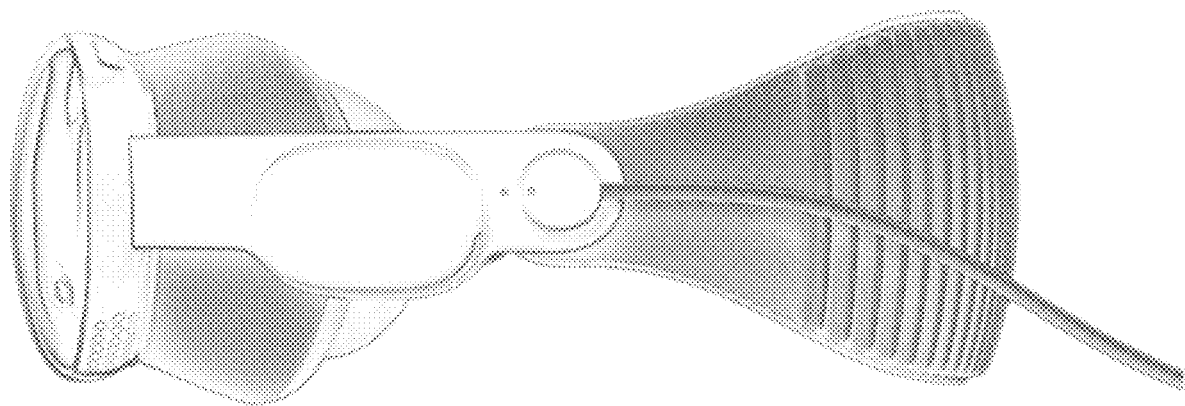
FIG. 1C shows a photo of Pro-vision from Apple.
Figure 2:
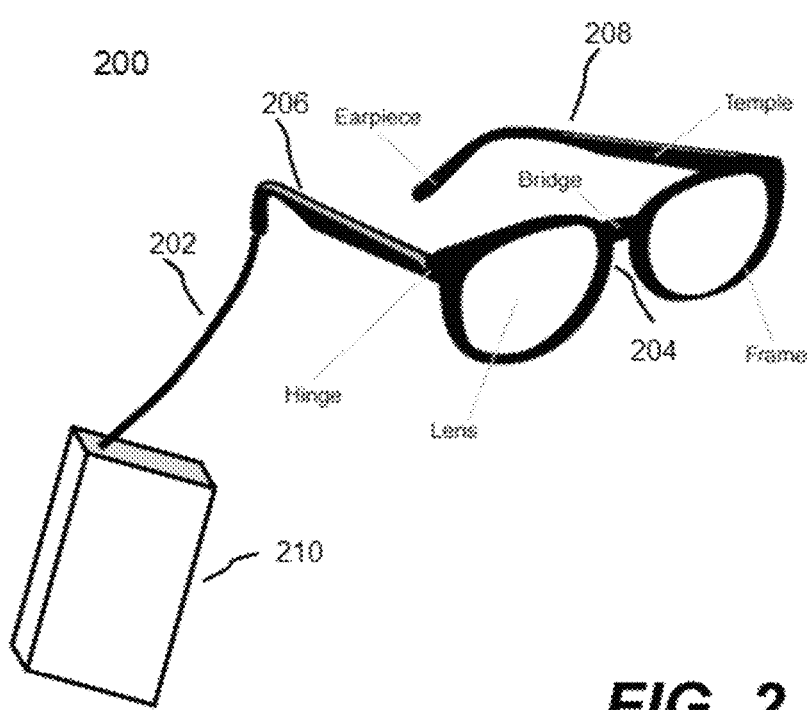
FIG. 2 shows a pair of exemplary glasses that can be used for the application of VR according to one embodiment of the present invention.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-6B. However, those skilled in the art will readily appreciate that the detailed description given herein with respect to these figures is for explanatory purposes as the invention extends beyond these limited embodiments.

Referring now to the drawings, in which like numerals refer to like parts throughout the several views. FIG. 2A shows a pair of exemplary glasses 200 that may be used for applications of XR according to one embodiment of the present invention. The glasses 200 appear no significant difference to a pair of normal glasses but include at least one flexible cable 202 that may be extended from the temple 206 or 208. According to one embodiment, the flexible cable 202 and the temple 206 or 208 are integrated or removably connected at one end thereof and include one or more optical fibers.

The flexible cable 202 is coupled at another end to a portable computing device 210, where the computing device 210 provides various control signals and data including (video) image data. The computing device 210 includes circuitry to drive an imager (not shown) and causes the imager to generate optical images based on the image data. The optical images defined as light intensities are captured or projected onto an optical cube (not shown) disposed in, on or near a bridge 204.

Figure 3A:
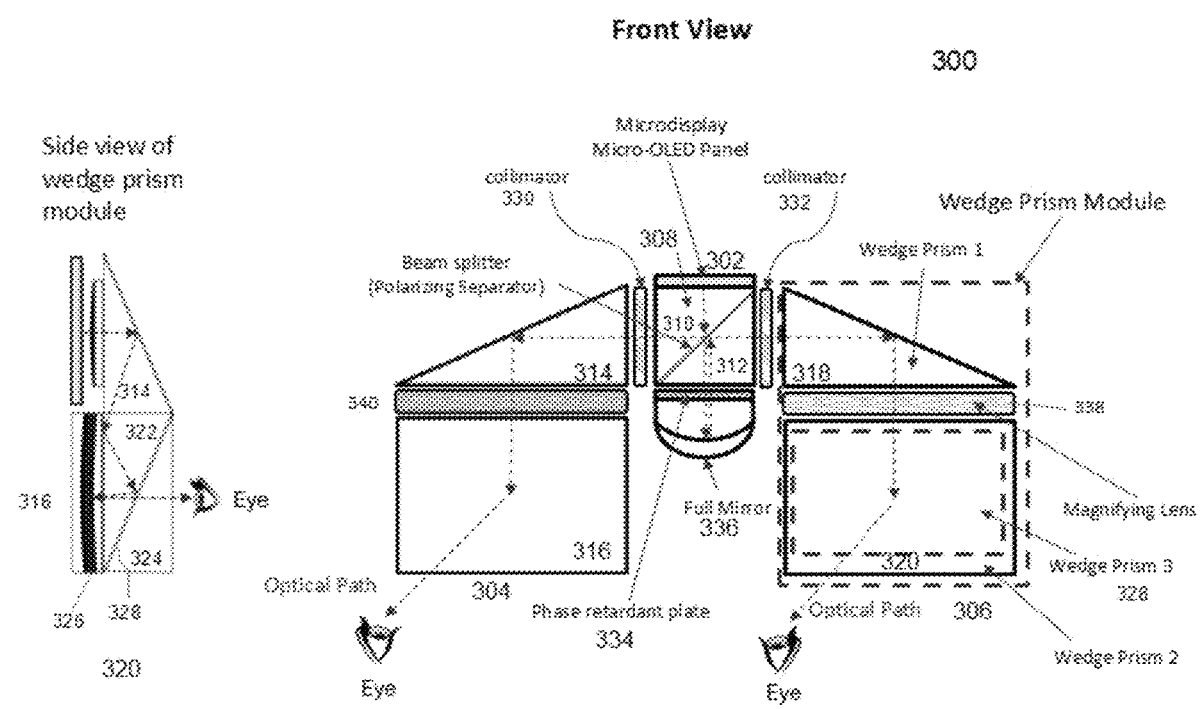
FIG. 3A shows a configuration using one imager to deliver optical images respectively or simultaneously to two different integrated lenses via an optical cube (e.g., integrated or stacked one or more lens)
Figure 3B:
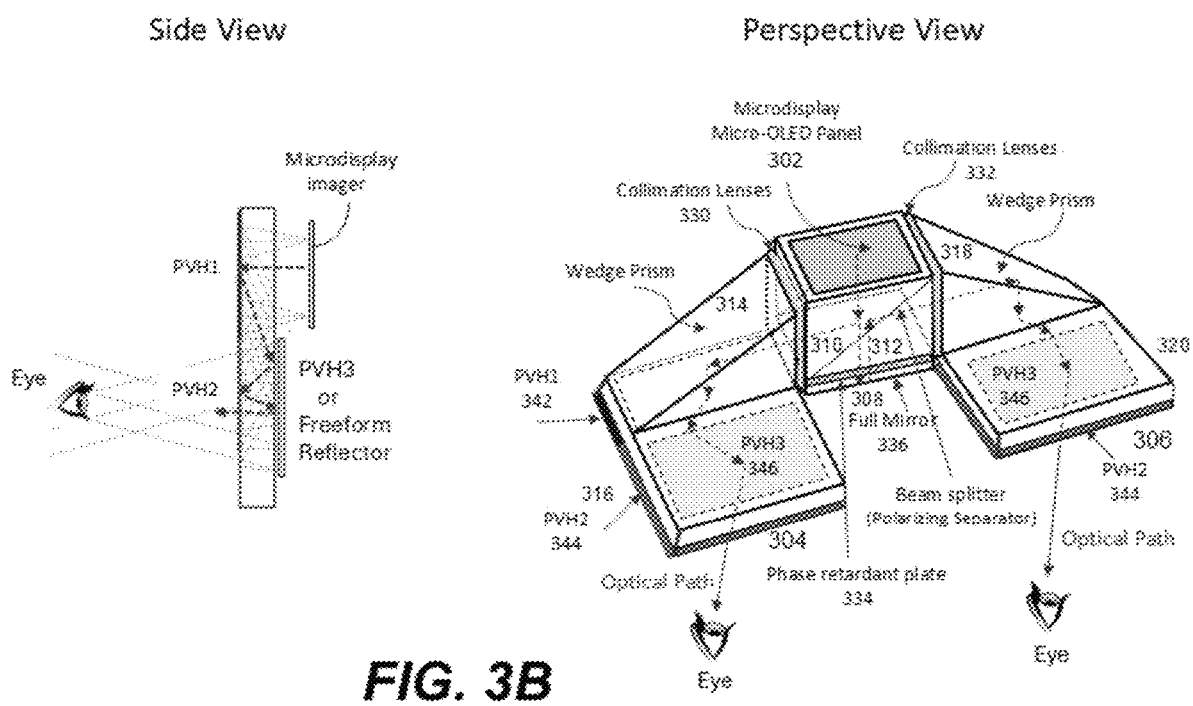
FIG. 3B shows a corresponding 3D sketch of FIG. 3B for better understanding of the present invention.

Referring now to FIG. 3A in conjunction with FIG. 3B showing a corresponding 3D sketch for better understanding, it shows a configuration 300 of using one imager 302 to deliver optical images respectively or simultaneously to two different integrated lenses 304 and 306 via an optical cube 308 (e.g., integrated or stacked one or more lens). According to one embodiment, the cube 308 is a beamsplitter with a ratio of 50:50 to split a beam of light (optical images) into a reflected and a transmitted beam or a left and a right beam. Depending on implementation, a coating or film with optical characteristics to split an incoming light equally or in a predefined ratio may be disposed between the two halves 310 and 312 to form the cube 308. As the name suggests, the left beam goes left and is reflected by a left prism 314 into a left lens 316 while the right beam goes right and is reflected by a right prism 318 into a right lens 320. As the left side view of the lens 320 in FIG. 3A, the lens 316 or 320 includes two optical halves or prisms 322 and 324. The reflected beam is projected into the first prism 322 at a predefined angle and reflected to a focal mirror 326 that further reflects the reflected beam back via the second prism 324 into an optical path where a human eye can see.

According to one embodiment, there is a coating or film 328 between the two halves 322 and 324. The film 328 includes optical characteristics that reflect an incoming beam at a predefined angle and allow an incoming beam to pass through at another angle. In another embodiment, there is only a small piece of reflective coating or film disposed partially between the two halves 322 and 324. With a calibrated or adjusted position, the small film reflects all incoming beams at a predefined angle and the small film is not in the way of other optical path, thus a reflected beam from the mirror 326 passes through the two halves 322 and 324.

According to one embodiment, a collimator 330 or 332 is disposed near or next to either one of the prisms 322 and 324 to facilitate full capture or transmission of all the split beams from the cube 308. In another embodiment, a phase retardant plate 334 is optionally employed to alter the phase of a polarized light passing through it. The plate changes the phase difference between the two orthogonal components of light by slowing down one component relative to the other, usually by a specific fraction of a wavelength. Depending on implementation, the phase retardant plate 334 is a half-wave plate (half-wavelength phase shift, useful for rotating the polarization direction of linearly polarized light) or quarter-wave plate (quarter-wavelength phase shift, useful for converting linearly polarized light into circularly polarized light and vice versa). The exact use of which one of the half-wave or quarter-wave plate depends on what video/image a user is viewing. In the event that an optical image comes in a sequence of alternating S- and P-polarization, the phase retardant plate 334 may facilitate the separation of the image sequences into S-polarization only and P-polarization only. Alternatively, the phase retardant plate 334 may be used to correct or readjust the phase of the incoming beams so that both the left and right optical images have the same polarization.

The mirror 336 is optionally provided to reflect any light that may leak out from the cube 308. Any light leaking from the cube 308 may reduce the efficiency of the light beam being split by the cube 308. The mirror 336 may minimize the leaking so as to maintain or keep the efficiency of the beamsplitter 308. According to one embodiment, a pair of magnifying lenses 338 and 340 is respectively disposed between the left prism 314 and the left lens 316 as well as the right prism 318 and the right lens 320. As a light beam passes through the magnifying lens 338 or 340, the beam gets amplified, resulting in an optical image spreading across the left lens 316 or the right lens 320.

Figure 3C:
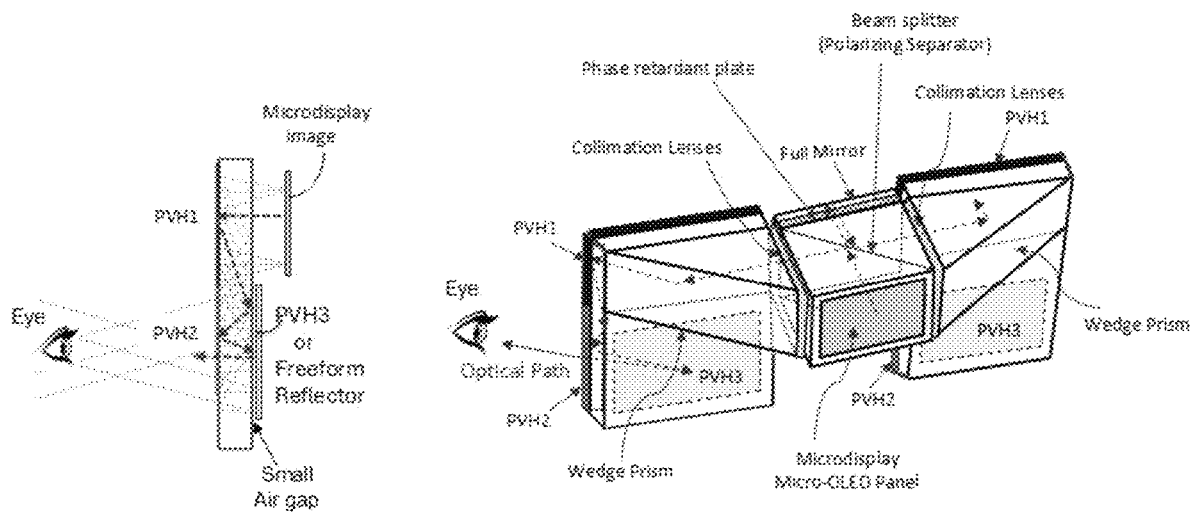
FIG. 3C shows another corresponding 3D sketch of FIG. 3A.

FIG. 3B shows a perspective view of the configuration 300 of FIG. 3A. Not clearly showing in FIG. 3A, but FIG. 3B together with FIG. 3C shows that there are depositions, coatings or films 342, 343 and 346, referred herein also as PVH1, PVH2 and PVH3. PVH stands for Polarization Volume Hologram (PVH) and is a type of lens that leverages holographic principles to focus or manipulate light in a thin, flat structure rather than a traditional bulky curved lens. It is part of recent advancements in optics and photonics aimed at creating ultra-thin, lightweight, and highly efficient lenses for various applications. Two articles discussing the details of the PVH lens, entitled respectively "Planar liquid crystal polarization optics for augmented reality and virtual reality: from fundamentals to applications" and "Holographic optical elements for augmented reality: Principles, present status and future perspectives" by Jianghao Xiong, et al are hereby incorporated by reference.

Figure 4A:
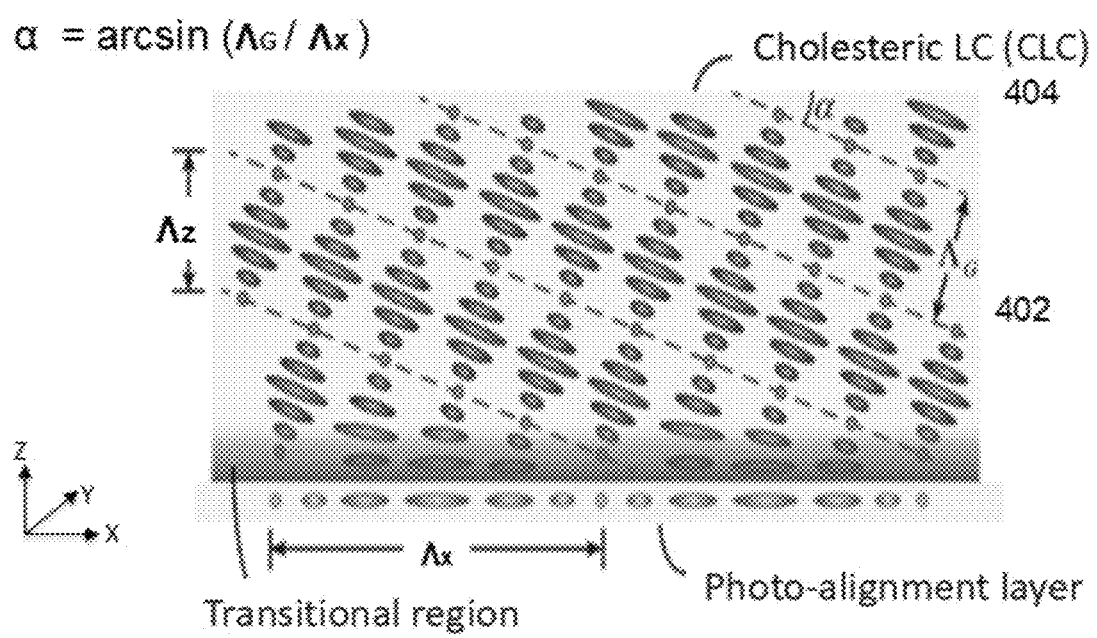
FIG. 4A shows an exemplary cross-section of a PVH lens.

One of the important features in PVH lens is its planar design. Unlike traditional lenses, which are typically curved to bend light, PVH planar lenses are flat and can be made ultra-thin, often in form of a (optical) film or coating. This reduces the weight and bulkiness, making them useful in applications where size and weight are critical (e.g., AR glasses, compact cameras, or medical imaging devices). FIG. 4A shows an exemplary cross-section of a PVH lens 400. The bottom sinusoidal photo-alignment pattern 402 provides a local periodic pattern, which makes the helical CLC structure 404 tilt to form the bulk tilted helical structure. The tilted helical structure can establish efficient Bragg diffraction, similar SRG and traditional hologram. The helical cholesteric liquid crystal (CLC) is a type of liquid crystal that exhibits a helical (spiral) structure, which is why it is often called "helical CLC." This structure gives it unique optical properties, especially with how it reflects light. In FIG. 4A, a PVH has a period of Λx in X-Y plane and a period of Λz in Z axis direction. Periodical refractive index planes have a period of ΛG, where ΛG depicted means the period of periodical refractive index planes, which can be calculated by a Bragg equation after determining a center wavelength. The LC director rotation plane could be slanted to the x-z plane and along the Y axis.

Cholesteric Liquid Crystals (CLC), also known as Chiral Nematic Liquid Crystals, have a unique molecular arrangement where molecules are aligned in layers, but each layer rotates slightly relative to the one before it. This rotation creates a helical or spiral structure, which is characterized by its pitch (the distance over which the molecules complete one full rotation in the spiral). The pitch of the helix determines the wavelength (color) of light that the liquid crystal can reflect. The helical CLCs reflect specific wavelengths of light based on the pitch of the helical structure, giving them a striking ability to reflect vibrant colors without the need for dyes or pigments. The wavelength (and thus the color) of light reflected by helical CLCs can be tuned by changing the pitch of the helix. This can be achieved through changes in temperature, electric fields, or even by altering the molecular composition. The chiral nature of helical CLCs means they interact differently with left- and right-handed circularly polarized light. They can selectively reflect one type of circularly polarized light.

It shall be noted the PVH lenses are used in one embodiment to redirect light beams or optical images in a predefined angle or direction. A diffractor or lens that demonstrates similar optical characteristics may be used in other embodiments to redirect light beams or optical images in a predefined angle or direction. The purpose of this diffraction or reflection of light by employing such a diffractor or lens is to minimize the thickness of the left lens 316 or the right lens 320 of FIG. 3A that comes in a standard shape (e.g., rectangular), making the lens less sensitive to distortion for various reasons.

Figure 4B:
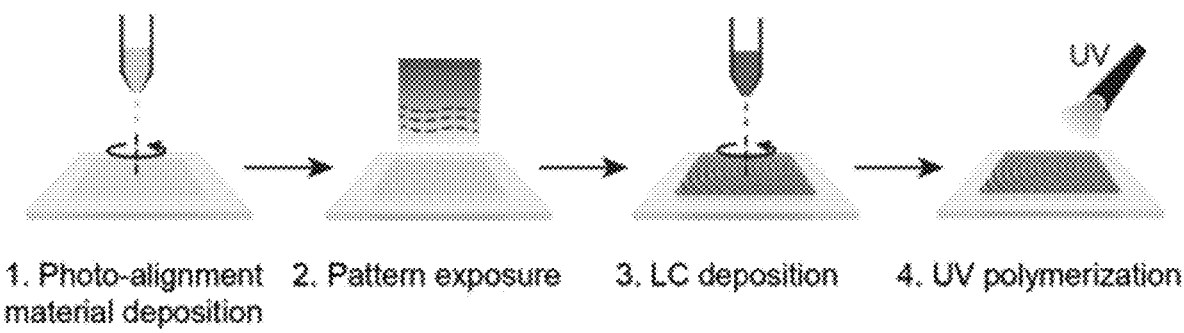
FIG. 4B shows an exemplary fabrication process of a PVH lens.
Figure 4C:
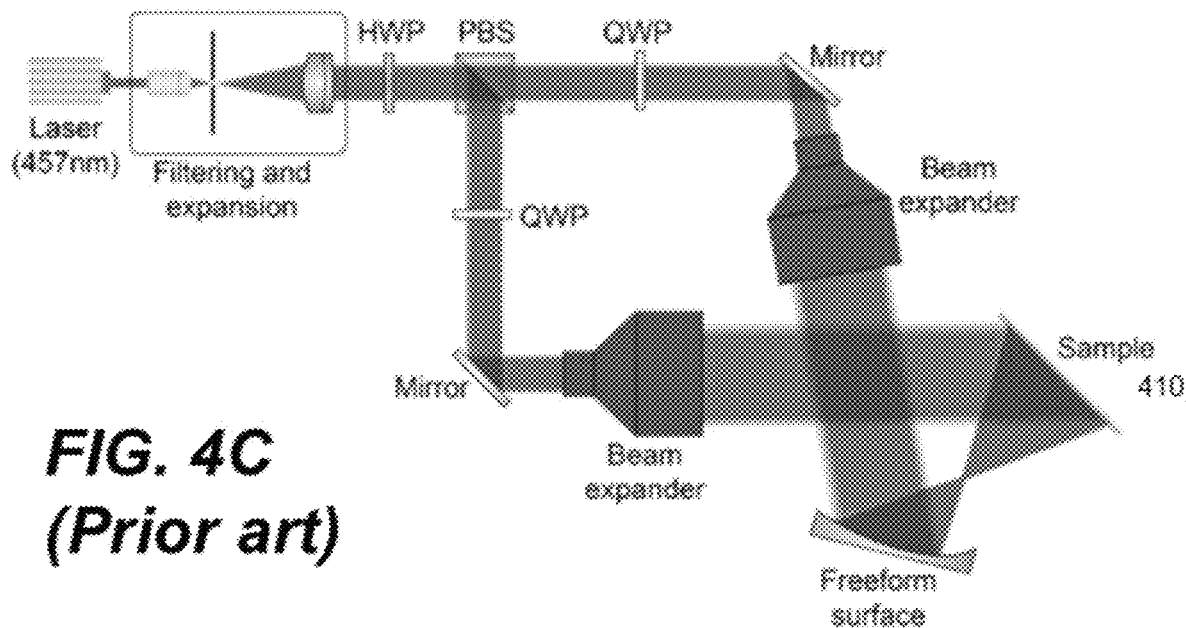
FIG. 4C shows an exemplary setup to calibrate a sample (i.e., a PVH lens), namely forming a unique molecular arrangement depending on a specified application of the PVH lens.
Figure 4D:
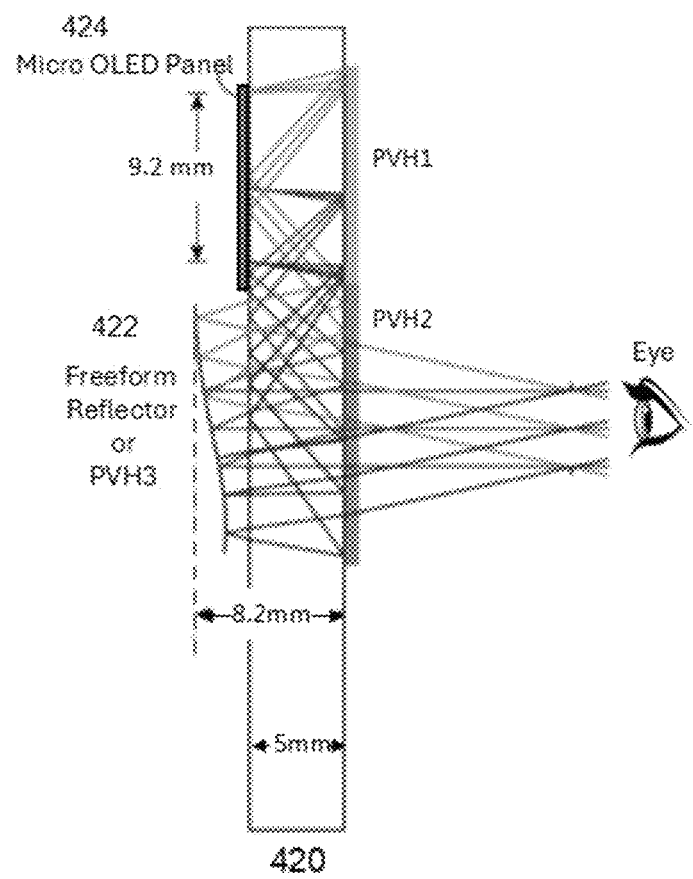
FIG. 4D shows an example of using two planar PVH thin-films (PVH1 and PVH2) on a lens and one freeform reflector.
Figure 4G:
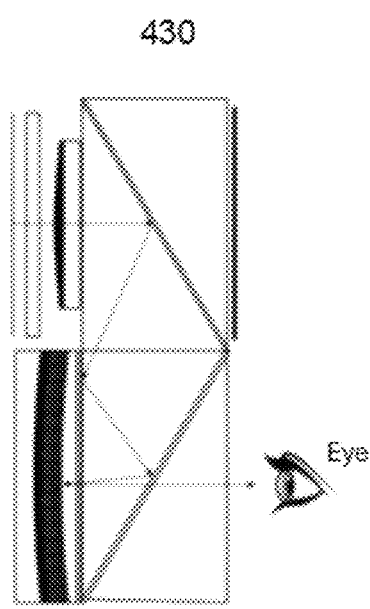
FIG. 4G shows a modified embodiment based on FIG. 3B.

FIG. 4B shows an exemplary fabrication process of a PVH lens. Depending on implementation, different deposition methods may be used and include spin coating, slot-die, spray-coating, dip-coating and etc. Different exposure methods may be used and include interferometer, laser direct write or optical replication. FIG. 4C shows an exemplary setup to calibrate a sample (i.e., a PVH lens), namely forming a unique molecular arrangement depending on a specified application of the PVH lens. The calibration shown in FIG. 4C may be used to determine how a PVH lens 410 is used to diffract a light beam. FIG. 4D shows an example of using two planar PVHs thin-films (PVH1 and PVH2) on a lens 420 (e.g., transparent plastic-type polymer lens) and one freeform reflector or PVH3 422. In operation, an optical image from an imager 424 (e.g., an OLED panel) is generated and projected onto a first lens PVH1. PVH1 is so calibrated to make sure that the image is diffracted to the lens 420, where the reflector 422, either a freeform reflector or another PVH3, is optionally disposed on a predefined position on the lens 420 to capture any leaking of the optical image from the lens 420 if reflection of the image from the lens 420 is not perfectly blocking the transmission of the image throughout.

Depending on implementation, a coating may be applied to one side of the lens 420 as a reflector or the freeform reflector 422 may be disposed near or on the lens 420. The image is reflected onto a second lens PVH2 that is disposed to capture all the reflection, some from the total internal reflection within the lens and other from the reflector 422. In one example with the use of the PVH lenses, a field of view (FOV) can reach 50° (24° by 44°) with the lens 420 being physically thin. FIG. 4E and FIG. 4F each show another embodiment. Instead of using a reflector 422 shown in FIG. 4D, a third lens PVH3 may be used to possibly reduce the weight of the lens 420 and optical volume and thickness.

Referring back to FIG. 3B, each of the PVH1, PVH2 and PVH3 is predefined and provided in view of FIGS. 4A, 4B and 4C. With different optical characteristics, each of the PVH1, PVH2 and PVH3 lenses reflects a light beam differently depending on need. PVH1 referenced by 342 and PVC2 are disposed near or on one side of the integrated lens 304 while PHV3 is disposed on the opposite side of the integrated lens 304.

Figure 3D:
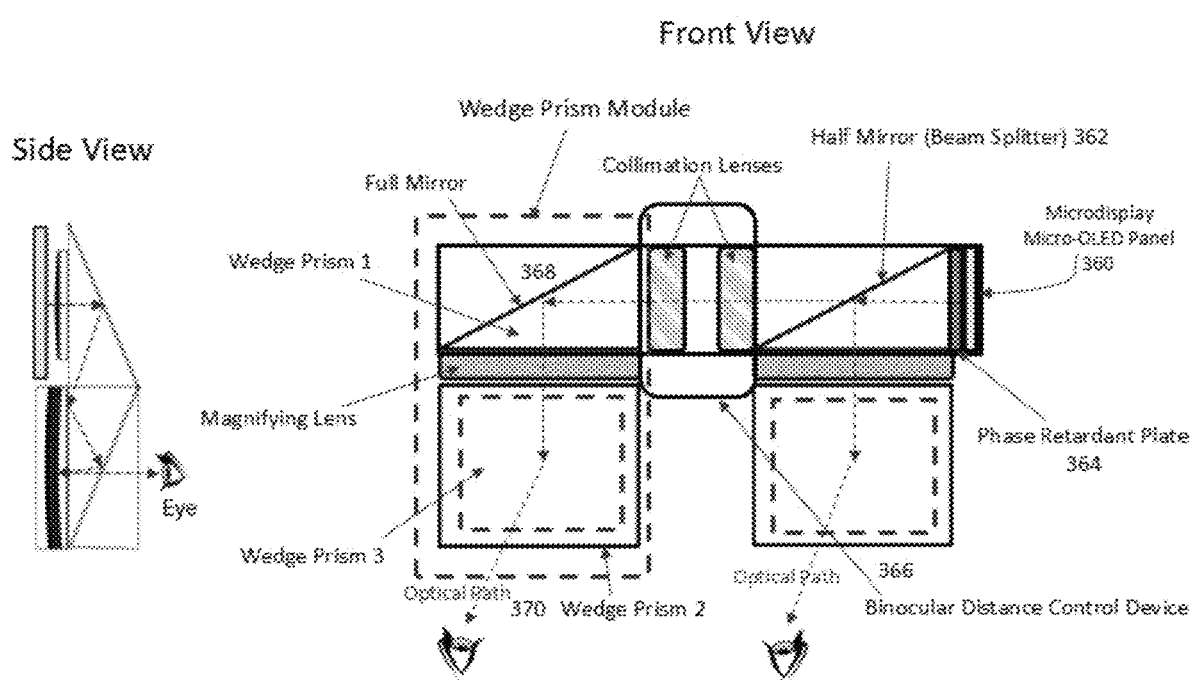
FIG. 3D shows another embodiment in which an imager is disposed on one side of a display device (display glasses)

Referring also back to FIG. 3D, it shows another embodiment in which an imager 360 is disposed on one side of a display device (display glasses). Optical images from the imager 360 are projected into an optical cube 362 via optionally a phase retardant plate 364, where the cube 362 is shown as a beamsplitter that splits the optical images into two parts. The first part goes to a first integrated lens 366 and the second part continues and is projected onto a second cube 368 that directs the second part to a second integrated lens 370. Without repeating the same, other optical parts such as the collimators and magnifying lens are self-explained in view of FIG. 3B. FIG. 4F shows an embodiment 430 based on FIG. 3B. In view of the embodiment of FIG. 3B, an additional prism 432 is provided so that the entire integrated optical parts come in a rectangular shape.

Figure 5A:
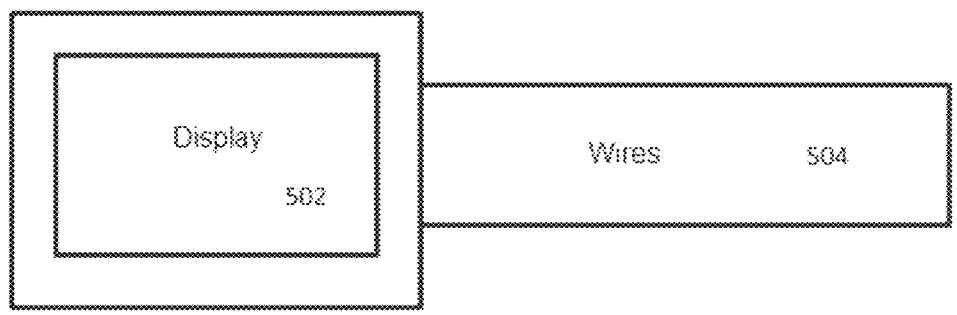
FIG. 5A shows an exemplary microdisplay that may be used in the embodiments of FIGS. 3A-3D.

Referring now to FIG. 5A, it shows an example 500 of a microdisplay that may be used in the embodiments in FIGS. 3A-3D. The microdisplay 500 is a small-sized display screen in high resolution. Despite their small physical size, microdisplays often provide high pixel density, excellent image clarity, and low power consumption. Types of the microdisplays include LCD (Liquid Crystal Display), OLED (Organic Light Emitting Diodes), LCOS (Liquid Crystal on Silicon), MicroOLED and MicroLED. They often come in a similar form, namely a small display screen 502 and an array of conductors 504 for data, control and power, where the display screen 502 is used to display images that are captured to produce optical images. In general, the display 503 shows a color image or three consecutive colored (e.g., red, green and blue) images.

Figure 5B:
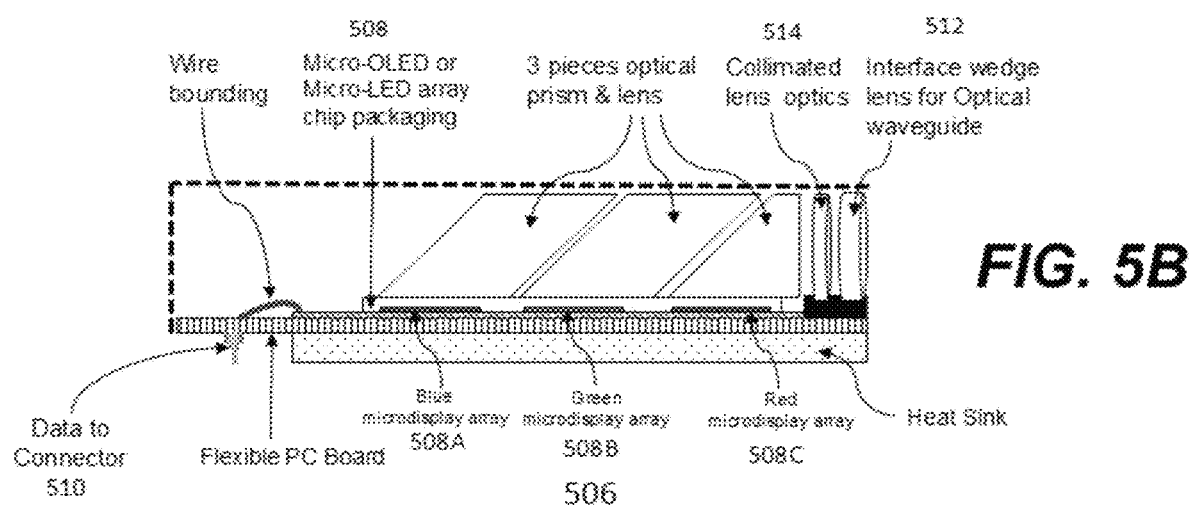
FIG. 5B show a microdisplay including three self-aligned subpanels, each designated to show one colored image, for example, red (R), green (G) or blue (B) colored image.

According to one embodiment of an exemplary imager as shown in FIG. 5B, a display 506 corresponding to the display 502 of FIG. 5A includes three self-aligned panels 508A, 508B and 508C, each designated to show one colored image, for example, red (R), green (G) or blue (B) colored image. As used herein, a colored image is a monochromatic image of single color. The combination of three monochromatic images in red, green and blue reproduce the full colors in a color image. Significantly different from the traditional microdisplay, such as a single LCOS or OLED imager, the microdisplay 506 uses the three colored display panels (e.g., red, green and blue) 508, side by side or in parallel, to show three individual colored images. It is assumed that a data cable 510 provides data related to three individual colored images in red, green and blue or other three primary colored images. Each of the data sets for a color is used to drive one of the three colored display panels 508.

Figure 5C:
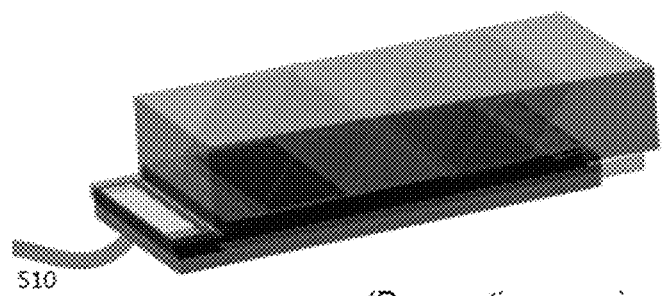
FIG. 5C shows a perspective view of an exemplary package of the imager of FIG. 5B.
Figure 5D:
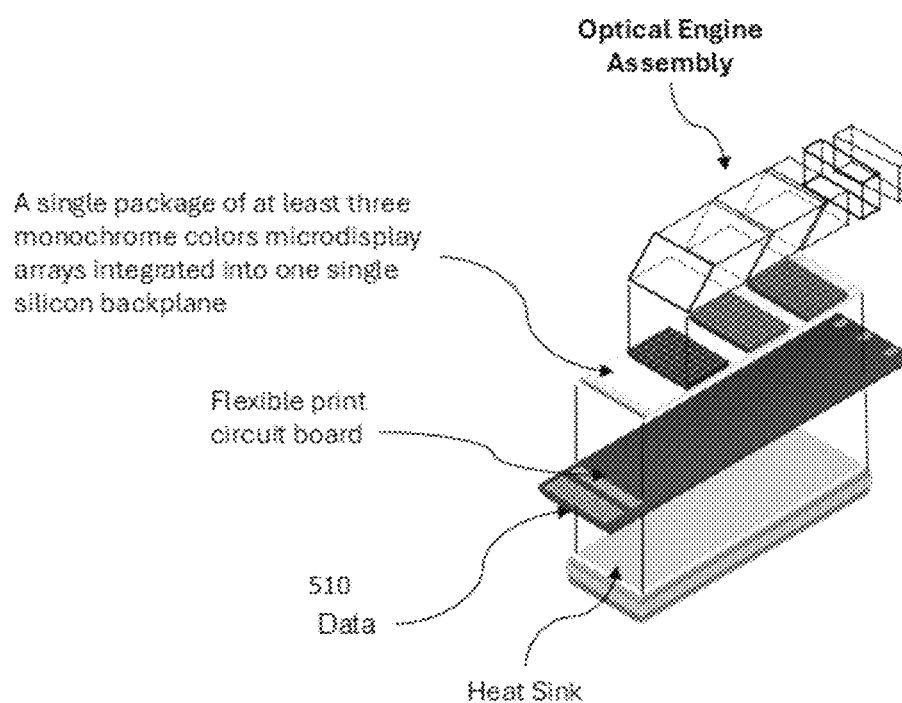
FIG. 5D shows a corresponding explosive view of FIG. 5C.

Depending on an implementation, the panels 508 may be implemented in µOLED or µLED or any self-illuminated devices. Given the proper data, control signals and power, the panels 508 can be lighted in accordance with the respective data sets. The details of the circuitry including the memory designs to drive these panels 508 are ignored to avoid obscuring other aspects of the present invention. FIG. 5C shows a perspective view of an exemplary package of the imager of FIG. 5B. FIG. 5D shows a corresponding explosive view of FIG. 5C.

Figure 5E:
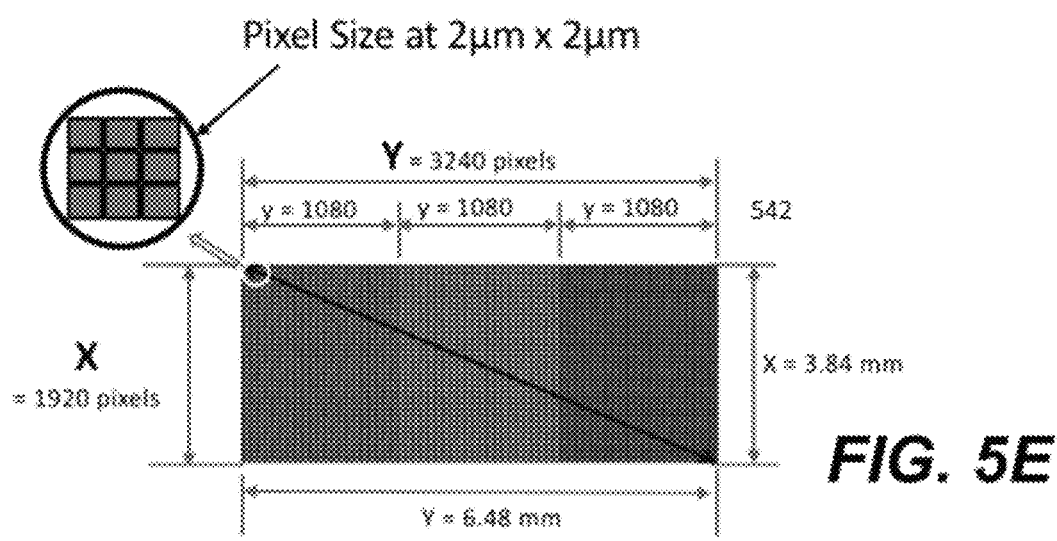
FIG. 5E and FIG. 5F together in view of FIG. 5D show that there are three reflectors or mirrors positioned diagonally and respectively above three panels to turn all the reflected lights (three colored optical images) into one direction.
Figure 5F:
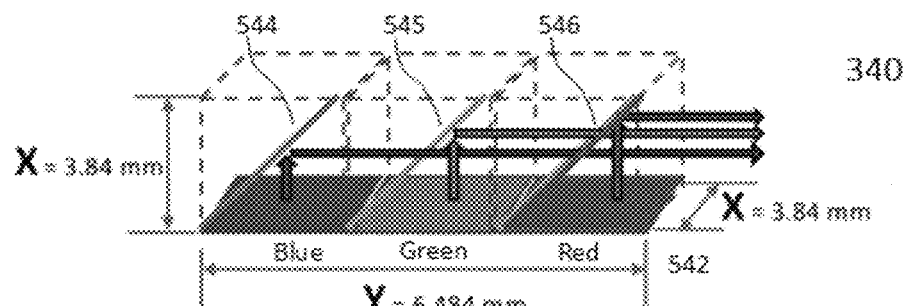

FIG. 5E and FIG. 5F together in view of FIG. 5D show that there are three reflectors or mirrors 544-546 positioned diagonally and respectively above the three panels 542 to turn all the reflected lights (three colored optical images) into one direction. Specifically, the mirror 544 for blue is positioned at 45 degrees above the panel for blue image. As a result, the mirror 544 turns the lights from the blue image towards the green and red panels. The mirror 545 for green is positioned at 45 degrees above the panel for green image, but the mirror 545 is specially coated and reflects only the green lights. In other words, the blues lights from the mirror 544 can pass through the mirror 545, which allows the blue lights to be mixed with the green lights. Similarly, the mirror 546 for red is positioned at 45 degrees above the panel for red image, but the mirror 546 is specially coated and reflects only the red lights. In other words, the blue light, the green light or the mixed blue and green lights can pass through the mirror 546, which allows the red lights to be mixed further with the already mixed blue and green lights. Pixels are in these three optical images are precisely registered as the three panels 542 are fabricated together. Now with the available three individual lights or mixed red, green and blue lights, an optical color image is formed. In other words, the microdisplay 506 including these panels 508 provides a full color optical image or video that is then focused onto the light guide 512 via the lens 514 of FIG. 3B. It should be noted that the reproduction of a full color image can also be achieved by the successive arrival of the three individual colored optical images in a human vision.

Figure 5G:
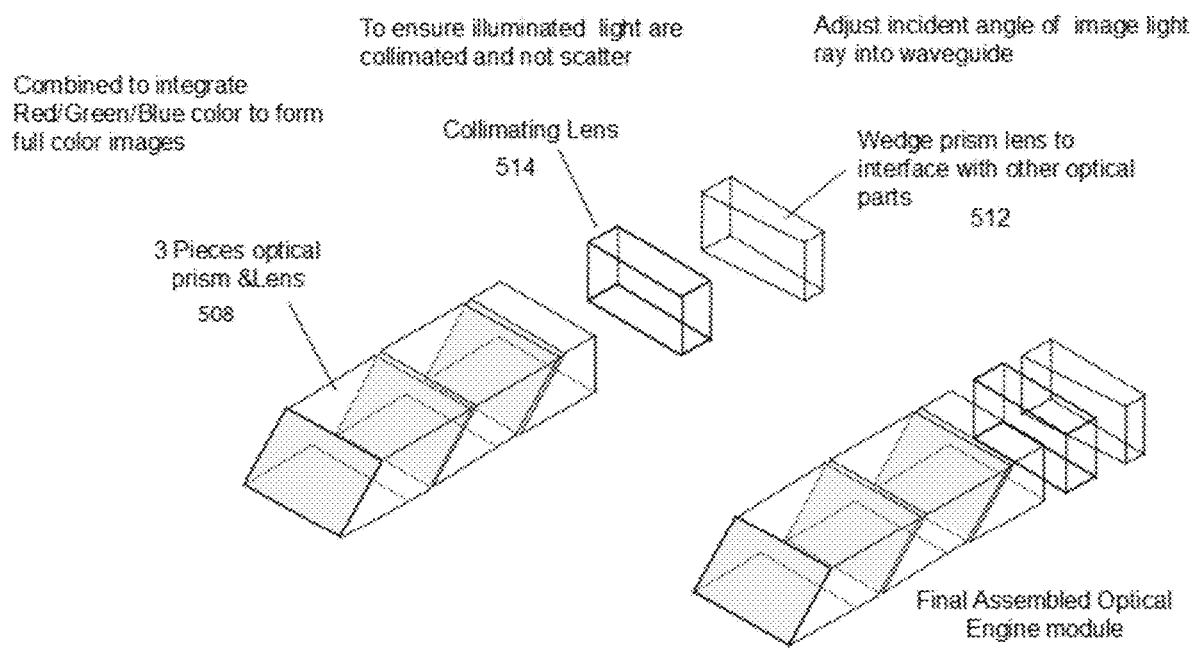
FIG. 5G shows an exemplary assembly of the package of FIG. 5O.

FIG. 5G shows an exemplary assembly of the package of FIG. 5C. It details how a wedge 512 and a collimating lens 514 are position with respect to the three self-aligned panels 508A, 508B and 508C and the mirrors 544-546. One of the advantages, benefits and objects in using three parallel self-illuminated panels is the significant reduction in costs of manufacturing these panels. Instead of arranging colored sources interlaced (e.g., RGBRGBRGB), the three parallel self-illuminated panels won't require any interlacing structure. As shown in FIGS. 5E and 5F, a whole panel could be made without the interlacing structure. In other words, a colored filter may be uniformly applied across an array of display elements (pixels). When OLED materials are used, the colored segments or pigments can easily be deposited without high resolution lithography for pixelization, resulting in small and high resolution OLED panels that produce efficient and brighter emission via tandem structure and micro-cavity technology. The full colors are achieved via optics by merging the three colored lights from the three different panels. Overall, the microdisplay can be made very compact with sufficient intensity in near-eye displays.

Figure 5H:
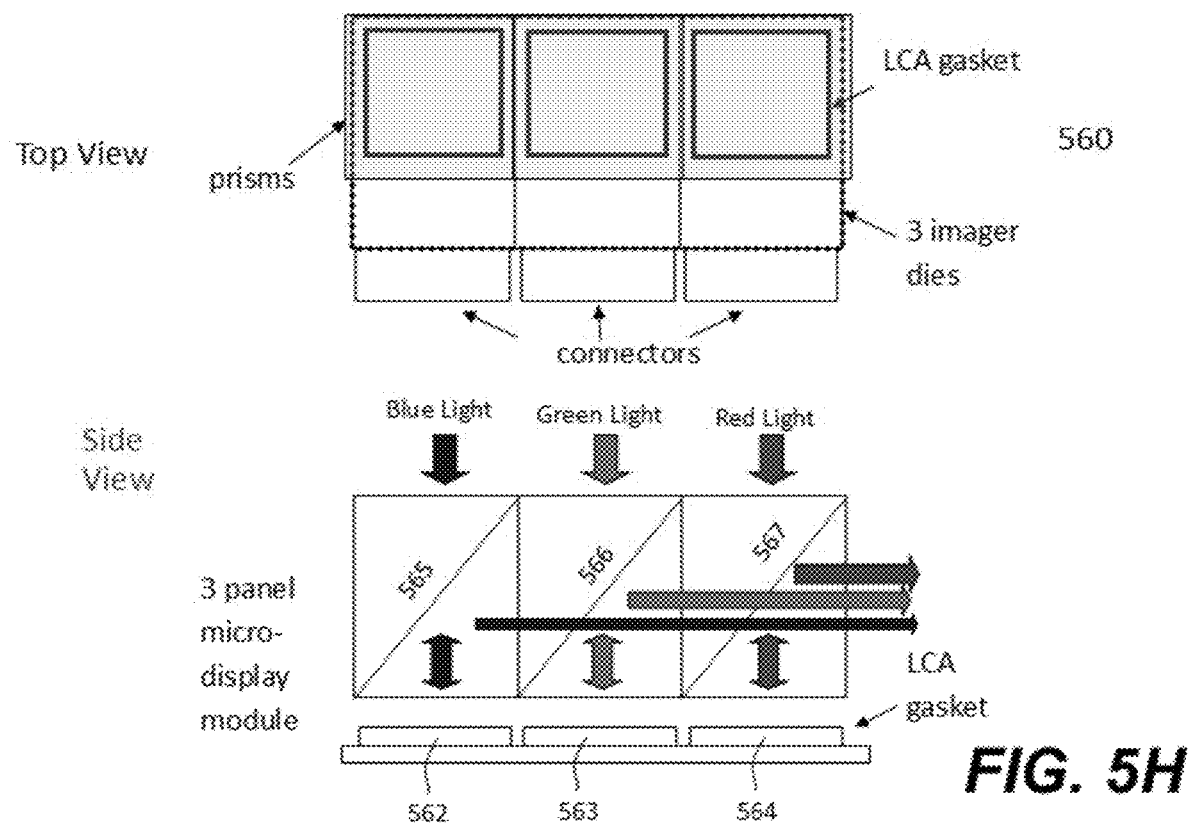
FIG. 5H shows an embodiment of using panels that are not self-illuminated devices.

FIG. 5H shows an embodiment of using panels that are not self-illuminated devices. An example of such panels is liquid crystal on silicon (LCoS or LCOS), a miniaturized reflective active-matrix liquid-crystal display using a liquid crystal layer on top of a silicon backplane. It is also referred to as a spatial light modulator. As the name suggests, it requires an external light to shine the panel to be modulated with the content being displayed. The reflected light (modulated) can be captured for display. FIG. 5H shows that there are three colored LCOS panels 562-564, respectively for red, green and blue. That means each of the panels 562-564 is specifically designated for showing a colored image, e.g., a red image, a green image and a blue image. Three independent external lights, Light Source 1, Light Source 2 and Light Source 3 are provided to shine the panels 562-564, respectively. The reflected light from each of the panels 562-564 hits a reflector or deflector. According to one embodiment, a polarized beam splitter (PBS) cube may also be used to deflect a colored light.

Structurally, the mirror 565 for blue is positioned at 45 degrees above the panel 562 for blue image. As a result, the mirror 565 turns the reflected light from the panel 562 towards the green and red panels. The mirror 566 for green is positioned at 45 degrees above the panel 563 for green image, but the mirror 566 is specially coated and reflects only the green light. In other words, the blue light from the mirror 565 can pass through the mirror 566, which allows the blue light to be mixed with the green light. Similarly, the mirror 567 for red is positioned at 45 degrees above the panel 564 for red image, but the mirror 567 is specially coated and reflects only the red light. In other words, the mixed blue and green lights can pass through the mirror 567, which allows the red light to be mixed further with the already mixed blue and green lights. Now with the mixed red, green and blue lights, an optical color image is formed. In one embodiment, the arrangement of far most blue, then to green and thereafter nearest red with respect to a focusing lens is specially designed due to the consideration of the wavelength of B, G and R with different diffractive index travelling distance of the optical path incident to the waveguide 512. In the end, the microdisplay 506 including these panels 508 along with the external lights can eventually reproduce a full color image or video that is then focused onto the light guide 512 via the lens 514 of FIG. 5B.

Figure 6A:
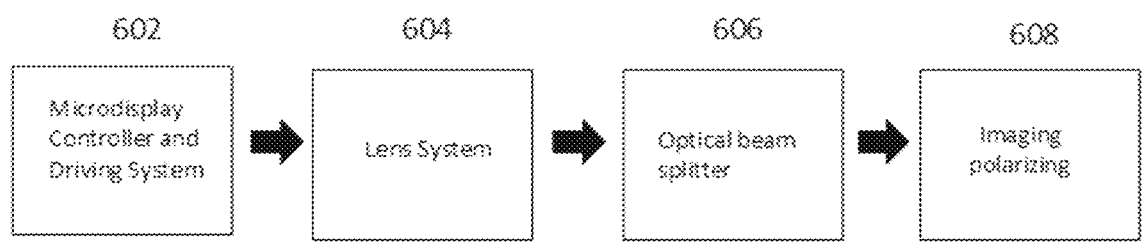
FIG. 6A shows a functional block diagram of displaying multimedia (e.g., graphics, objects, images or videos) in 2D or 3D according to one embodiment of the present invention.
Figure 6B:
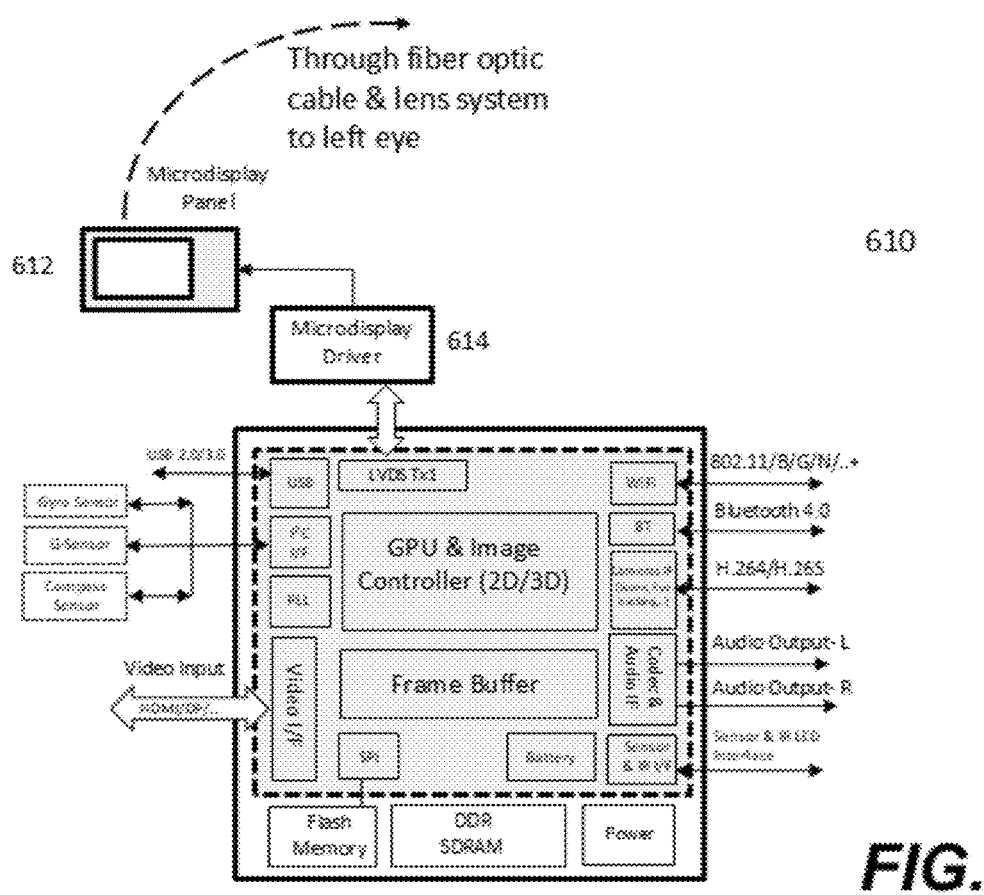
FIG. 6B shows an exemplary block diagram for the electronic portion of FIG. 6A to drive an (microdisplay) imager via a driver.

Referring now to FIG. 6A, it shows a functional block diagram 600 of displaying multimedia (e.g., graphics, objects, images or videos) in 2D or 3D according to one embodiment of the present invention. Referenced by 602 is an electronic/mechanic portion to generate the multimedia. FIG. 6B shows an exemplary block diagram 610 for the electronic portion 602 to drive an (microdisplay) imager 612 via a driver 614. According to one embodiment, the electronic portion 602 is packaged in an enclosure disposed somewhere in the display device (e.g., distributed along the temples of the glasses in FIG. 2) or carried around or worn by a user. Since there is only one source of images being generated in the electronic portion 602, there is only one cable needed. References by a block 604 is a lens system including one or more lenses and provided to capture optical images from the imager 602. The optical images are projected onto a designated optical part 606, for example, the cube 302 or a beam splitter in FIG. 3A, where the optical images are split to a left lens or a right lens.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display device comprising:
a single imager producing optical images;
an optical cube provided to split the optical images into a first portion and a second portion; and
an integrated lens receiving a portion of the optical images being either the first portion or the second portion, wherein the integrated lens being either a right one or a left one in the display device includes:
one or more polarization volume hologram (PVH) lenses, disposed on an exterior side of the integrated lens, wherein the portion of the optical images are projected onto a first PVH lens and directed to a second PVH lens via total internal reflections within the integrated lens, a third PVH lens is provided to reflect back any leaking portion of the optical images from the integrated lens, the portion of the optical images is subsequently turned into an optical path a human eye perceives.

2. The display device as recited in claim 1, wherein the one or more PVH lenses are respectively pre-calibrated and diffract the first portion or the second portion in the pre-defined direction.

3. The display device as recited in claim 2, wherein the first and the second PVH lenses, both having two different diffraction characteristics and disposed on the exterior side of the integrated lens.

4. The display device as recited in claim 1, wherein the one or more PVH lenses all having different diffraction characteristics, the first and second PVH lenses are disposed on the exterior side of the integrated lens and the third PVH lenses is disposed on an opposite exterior side of the integrated lens.

5. The display device as recited in claim 1, wherein the optical cube is a beam splitter.

6. The display device as recited in claim 2, wherein the optical cube is formed from two optical halves with a coating therebetween, the coating reflects the first portion meanwhile passing the second portion.

7. The display device as recited in claim 6, further comprising at least one prism to cause the portion of the optical images to make a sharp turn.

8. The display device as recited in claim 7, wherein the integrated lens further comprises: a lens on an edge thereof to receive the turned portion of the optical images, wherein the turned portion of the optical images is presented for viewing.

9. The display device as recited in claim 8, wherein the integrated lens further comprises: a magnifying lens to magnify the turned portion of the optical images before the turned portion of the optical images is projected into the lens.

10. The display device as recited in claim 6, further comprising a phase retardant plate employed to alter a phase of the portion of the optical images.

11. The display device as recited in claim 10, wherein the phase retardant plate is disposed on one side of the cube.

12. The display device as recited in claim 11, further comprising a reflector disposed behind the phase retardant plate to ensure that any possible leaking from the phase retardant plate is reflected back.

13. The display device as recited in claim 1 presented as a pair of glasses with two viewing lenses, wherein the single imager and optical cube are integrated and disposed between the two viewing lenses, wherein each of the two viewing lenses includes the integrated lens.

14. The display device as recited in claim 1 presented as a pair of glasses with two viewing lenses, wherein the single imager and optical cube are integrated and disposed near one end of each one of the two viewing lenses, wherein each of the two viewing lenses includes the integrated lens.

* * * * *